No. 693,827. Patented Feb. 25, 1902.
S. BOYER.
TRACE BUCKLE.
(Application filed Jan. 15, 1901.)
(No Model.)
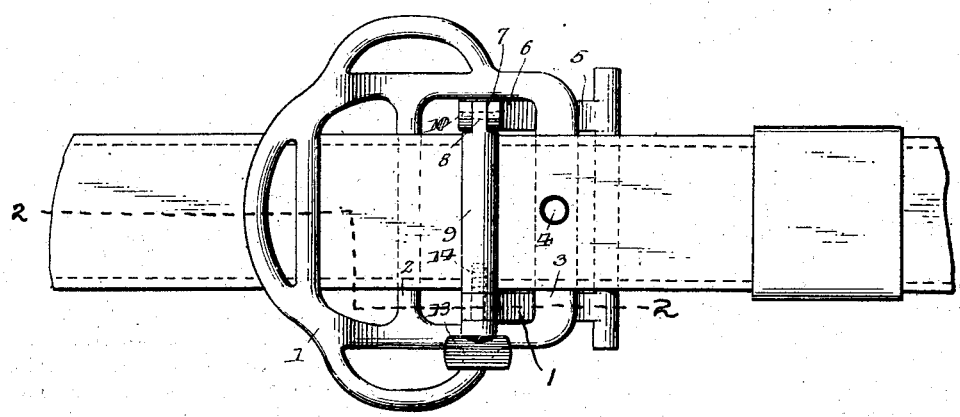
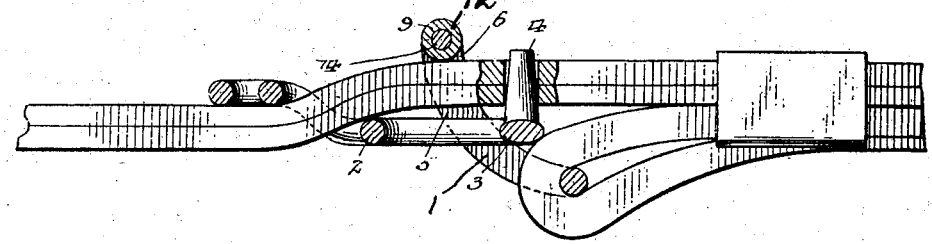
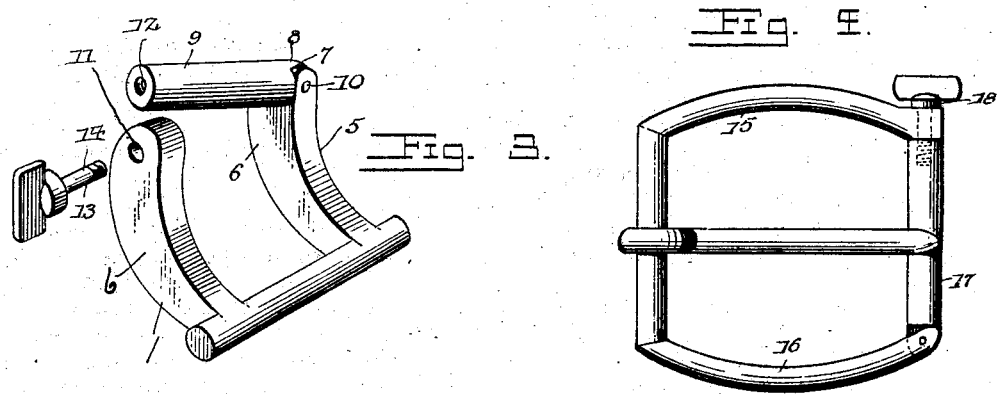
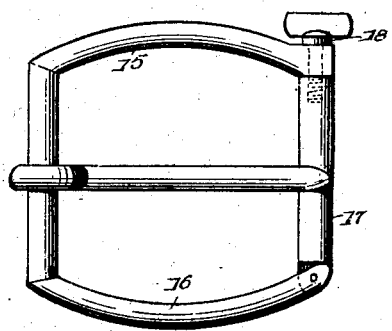
Witnesses
F. E. Alden.
Chas. S. Hyer.
S. Boyer, Inventor.
by C. A. Snow & Co.
Attorneys
THE NORRIS PETERS CO., PHOTO-LITHO., WASHINGTON, D. C.

UNITED STATES PATENT OFFICE.

SAMUEL BOYER, OF COLFAX, WASHINGTON.

TRACE-BUCKLE.

SPECIFICATION forming part of Letters Patent No. 693,827, dated February 25, 1902.

Application filed January 15, 1901. Serial No. 43,341. (No model.)

*To all whom it may concern:*

Be it known that I, SAMUEL BOYER, a citizen of the United States, residing at Colfax, in the county of Whitman and State of Washington, have invented a new and useful Trace-Buckle, of which the following is a specification.

This invention relates to trace-buckles and other similar fastening devices; and the object of the same is to provide in connection therewith a bar hinged thereto at one end and detachable at the opposite end, so that it can be easily and quickly opened or released to let out an engaged portion of a trace therefrom without buckling or bending the same or release a strap without requiring the usual mode of procedure and involving the release of a tongue or analogous device, whereby different portions of harness may be conveniently connected up or released, and particularly the latter operation when an animal falls and holds some part of the harness under him.

This invention consists in the construction and arrangement of the several parts, which will be more fully hereinafter described and claimed.

In the drawings, Figure 1 is a top plan view of a portion of a trace and a buckle with the bail of the latter embodying the features of the invention. Fig. 2 is a vertical section taken on the plane of the line 2 2, Fig. 1. Fig. 3 is a detail perspective view of the bail, showing the bar thereof hinged at one end and detachable at the opposite end. Fig. 4 is a detail plan view of an ordinary buckle, showing the improved features applied thereto.

Similar numerals of reference are employed to indicate corresponding parts in the several views.

The numeral 1, Figs. 1, 2, and 3, designates a trace-buckle having the usual frame, side loops, intermediate bar 2, and rear end bar 3, with a central upstanding stud 4. The usual form of bail 5 is also employed, with the addition of the improved features, consisting in hinging one of the end bars at one extremity and having the opposite end detachably connected. The one terminal of one of the side bars 6 of the bail is formed with a slot 7 to receive a tongue 8 on one extremity of the end bar 9, a pivot-pin 10 being passed through the said terminal of the side bar and the tongue to form a pivotal or hinged connection. The adjacent terminal of the opposite side bar 6 is formed with a transverse opening 11, and the loose end of the bar 9 is formed with a longitudinally-extending screw-socket 12 to receive a thumb-screw 13, the latter having its shank 14 in the main smooth and unthreaded, so that it will not be accidentally worked loose when in closing engagement with the said socket of the bar 9. When the screw 13 is in engagement with the one side bar 6 and the terminal socket of the bar 9, the latter will be held against movement and the bail will be maintained in closed condition to engage the strap or trace passed therethrough and hold the latter in proper relation to the stud 4 or, if the trace-buckle be without a stud, to retain the strap or trace therein as may be desired and necessary to arrive at the conjunctive assemblage required. When the bar 9 is released at one end by detaching the screw 13, the strap or trace can be easily disengaged and withdrawn and afterward readjusted without requiring buckling or bending of the same in order to thread it through the bail.

In Fig. 4 the same principle is shown embodied by an ordinary buckle 15, the one side bar 16 having the end bar 17 hinged at one end to the terminal thereof, the adjacent terminal of the opposite side bar 16 being transversely apertured and the near end of the end bar 17 provided with a longitudinal screw-socket to removably receive a thumb-screw 18 in the manner and for the purpose heretofore set forth.

By the improved construction of releasing attachment a strap or trace may be quickly applied to the buckle in either form or easily detached without drawing it through the same, and in cases of emergency, as when a horse has fallen, the parts of harness on him and partially under him can be conveniently loosened without breaking or cutting the same. The advantage of having one end of either bar 9 or 17 hinged and the opposite end detachable is that the said bar will be held in connection with the buckle at all times and be prevented from becoming lost or misplaced and also that only one screw must be operated in order to loosen the bar, so that it can be opened. The advantage of one screw for holding the bar 9 or 17 closed is material, as in the event of a horse falling on a portion of the harness or in effecting a release of the confined strap or trace the single screw can be more conveniently reached in many instances, whereas if two screws were employed the one might be disposed in such position that it could not be detached, and the attempt to release the bar would be ineffective. This latter advantage applies equally well in placing straps or traces in engagement with the buckles during the hitching operation, and by showing two different forms of buckles it is intended to be understood that the improved features will be applied to any other form of analogous device with which they can be used. The improved device in the two forms shown is also particularly useful on old harness that becomes stiff to prevent breaking straps or traces or other parts.

Having thus described the invention, what is claimed as new is—

A connection or coupling device comprising side bars immovably secured at one end to an end bar and having a clear open space between them, a movable end bar disposed opposite the rigid end bar which holds said side bars, the said movable end bar opening outwardly and closing inwardly in a plane parallel to the plane of the said side bars and pivotally connected at one end to one of the latter bars, the free end of the movable end bar being adapted to pass inside of the side bar opposite that to which the said movable end bar is pivotally attached, and a manually-operative screw removably engaging the free end of the movable end bar and the adjacent side bar, whereby the connection or coupling may be opened when lying in a flat position under pressure or weight to release a strap therefrom.

In testimony that I claim the foregoing as my own I have hereto affixed my signature in the presence of two witnesses.

SAMUEL BOYER.

Witnesses:
W. L. ETTINGER,
JULIUS BELLACH.